Sept. 1, 1959 — H. V. REED — 2,902,129
SEMI-CENTRIFUGAL CLUTCH
Filed Nov. 13, 1956 — 2 Sheets-Sheet 1
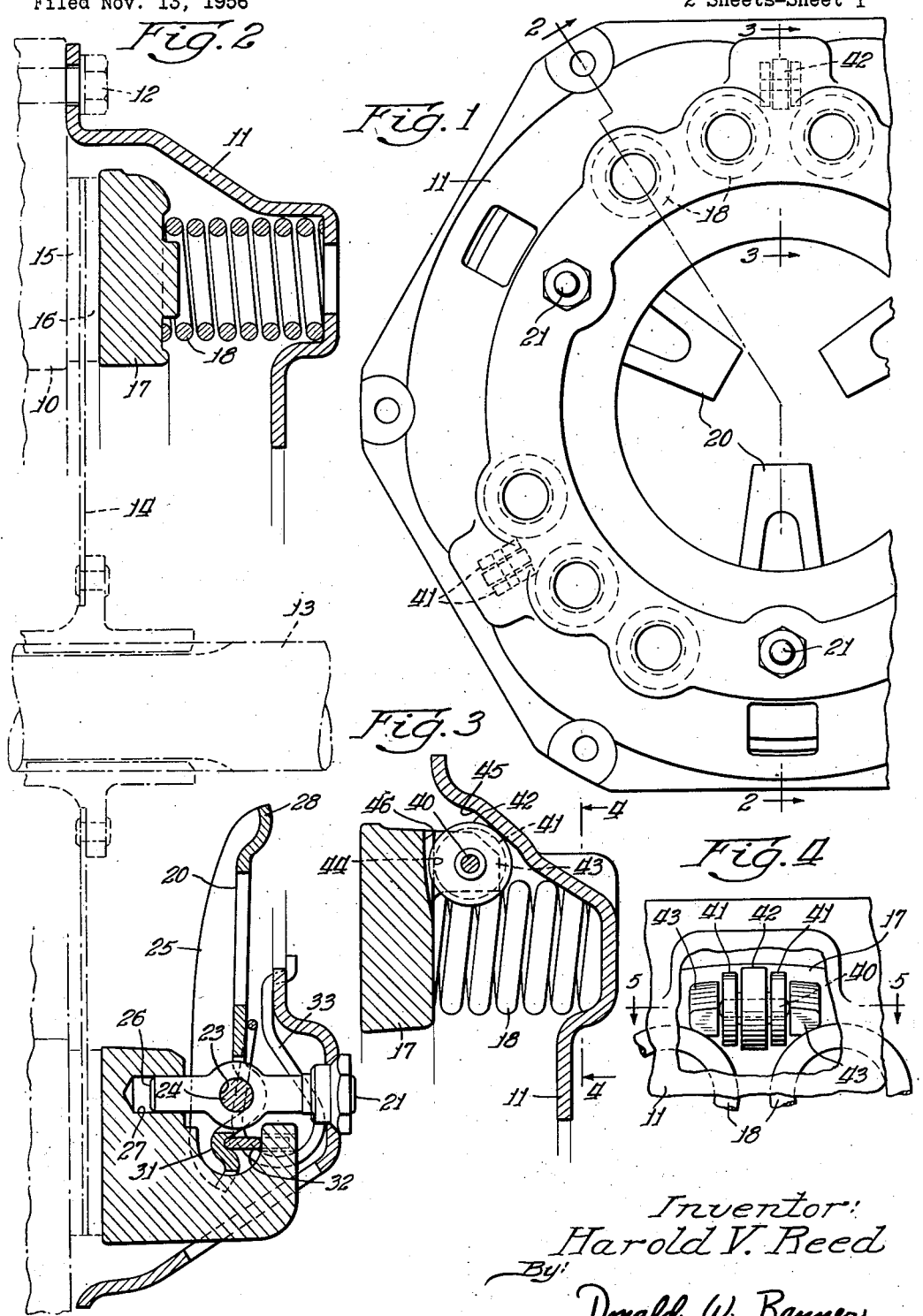
Inventor:
Harold V. Reed
By Donald W. Banner, Atty.

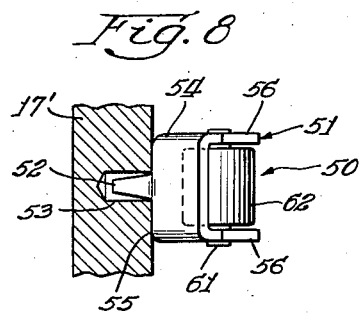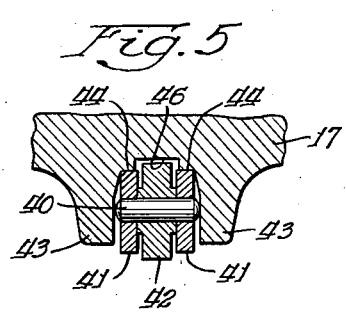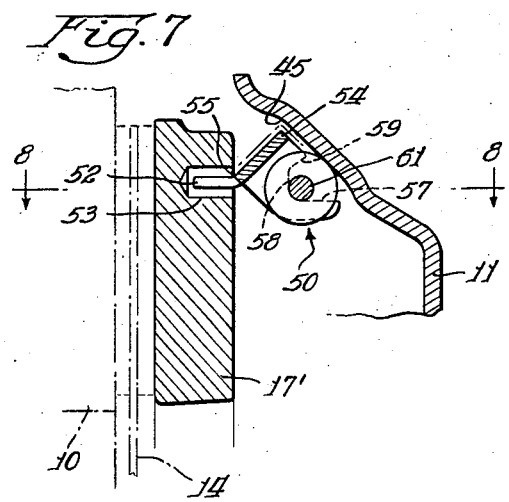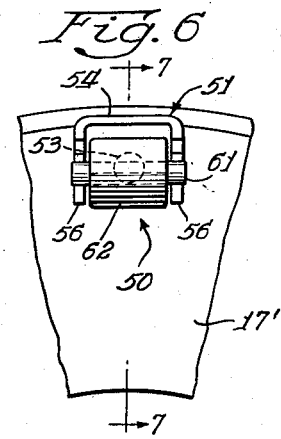

United States Patent Office 2,902,129
Patented Sept. 1, 1959

2,902,129

SEMI-CENTRIFUGAL CLUTCH

Harold V. Reed, Chicago, Ill., assignor to Borg-Warner Corporation, Chicago, Ill., a corporation of Illinois Application November 13, 1956, Serial No. 621,924

2 Claims. (Cl. 192—105)

This invention relates to friction clutches, and more particularly to semi-centrifugal types of friction clutches.

While friction clutches having semi-centrifugal features incorporated therein have been known for many years, devices employed in the prior art have either been relatively expensive, and consequently not acceptable for modern automotive utilization, or have inherently incorporated so much friction as to be unsuitable for modern automotive utilization.

It is therefore one object of the present invention to provide a novel semi-centrifugal clutch which is inexpensive and yet operable with little or no friction whatsoever.

Another object of the present invention is the provision of devices in accordance with the preceding object in which inexpensive centrifugally responsive roller means are employed adapted to operate with a minimum of friction.

Another object of the present invention is the provision of devices as set out above in which the roller means comprise a pair of spaced annular washers fixed to axle means, another roller being disposed between the washers and rotating about the axle.

Still another object is the provision of a novel semi-centrifugal clutch device including a centrifugal force responsive assembly comprising a pivoted holder having a centrifugal roller therein from which extend annular trunnions operating with line contact only along the sides of slots provided in the holder.

Other objects and features of the invention will be readily apparent to those skilled in the art from the specification and appended drawings illustrating certain preferred embodiments in which:

Figure 1 is a partial front elevational view of a device constructed in accordance with the present invention;

Figure 2 is an enlarged sectional view along the plane of line 2—2 of Figure 1;

Figure 3 is an enlarged partial sectional view along the plane of line 3—3 of Figure 1;

Figure 4 is a sectional view, with the cover member broken away, along the plane of line 4—4 of Figure 3;

Figure 5 is a sectional view along the plane of line 5—5 of Figure 4;

Figure 6 is a view similar to that of Figure 4 showing a modification of the invention;

Figure 7 is a sectional view along the plane of line 7—7 in Figure 6;

Figure 8 is a sectional view along the plane of line 8—8 of Figure 7.

Referring now to the drawings, there is illustrated therein a flywheel 10 to which is mounted a pressed steel clutch cover 11 by means of a plurality of bolts 12. Piloted in flywheel 10 is a driven shaft 13 on which is splined a clutch disc 14 having friction faces 15 and 16 on its opposite sides. Clutch disc 14 is adapted to be moved against flywheel 10 by means of a pressure plate 17, which is urged toward the flywheel by series of helical springs 18.

A standard release mechanism may be employed with the present invention, and for purposes of illustration only, the release mechanism illustrated in the figures may be identical with the one discussed in U.S. Patent No. 2,062,101 to Harold Nutt et al., dated November 24, 1936, which comprises clutch levers 20, pivotally mounted on eye bolts 21 supported in the cover 11, the clutch levers being adapted for operation by a standard clutch release mechanism (not shown).

Each eye bolt 21 has a central eye 23 forming a bearing for a transverse pin 24, which forms a pivot for the lever 20 and is retained in place in the aforementioned eye 23 by flanges 25 on the lever 20. The inner end portion 26 of each eye bolt 21 is received within an opening 27 in pressure plate 17 to maintain the eye bolt in proper position. One end 28 of clutch lever 20 is adapted to engage a release collar on the clutch release mechanism. The opposite end of each lever 20 is return bent at 31 to receive a strut 32, the opposite end of which is received in suitable grooves in pressure plate 17 so that when lever 20 is rotated counterclockwise from the view of Figure 2, the pressure plate 17 is moved against the tension of the pressure springs 18 to release the clutch disc 14 from clamping condition between the flywheel 10 and the pressure plate 17. Spring means 33 are provided which engage the cover 11 and the clutch levers 20 to properly position the clutch levers and prevent rattling.

Spaced alternately around the clutch from the levers 20 are the speed responsive means forming the present invention. Referring to that form of the present invention illustrated in Figures 1 and 3 through 5, there will be seen that these speed responsive means comprise an axle pin 40 having fixedly mounted thereon a pair of annular washers 41. Disposed between the washers 41 is a centrifugally responsive weight, in the form of an annular roller 42, having a central opening therein through which the axle 40 projects, the roller 42 being rotatable about the axle 40. As illustrated in Figure 5, the centrifugal weight assemblies are each received between a pair of spaced projections 43 formed integrally in the pressure plate 17, the projections 43 being provided with sloped camming surfaces 44 which are engaged by the washers 41. As best illustrated in Figure 3, the cover 11 is provided with a plurality of sloped camming surfaces 45 respectively engaged by a roller 42, the outer surface of each of the rollers 42 being disposed in engagement with one of these camming surfaces 45, the outer surface of each of the rollers 42, however, being spaced from any portion of the pressure plate 17 because of a slot 46 provided therein adjacent each roller 42.

As best illustrated in Figure 4, the washers 41 are radially aligned with portions of the springs 18 so that when the engine of the vehicle in which the clutch is disposed is not operating, the centrifugal weight assemblies comprising the washers 41 are prevented from falling out of the cavity formed between the projections 43 by the engagement of the washers 41 with the springs 18. However when the engine is operating, centrifugal force will move the centrifugal weight assemblies to the position illustrated in the figures.

In the operation of the device, with the clutch engaged and the centrifugal force developed being sufficiently large to cause operation of the centrifugal weight assemblies, it will be seen that these assemblies will be urged radially outwardly by centrifugal force. The washers 41 and the axles 40 will tend to be moved radially outwardly, washers 41 rolling along camming surfaces 44 which are so designed as to permit a radial rolling action to the washers 41. Simultaneously the rollers 42, being rotatable about their respective axles 40 will tend to move radially outwardly and the horizontal component of such action is applied by the rollers 42 to the camming surfaces 45 formed on the cover 11 which, as previously described, is fixed to the flywheel 10. As a result, the horizontal component of the centrifugal force on the centrifugal weight assemblies is applied to the camming surfaces 45 on the cover 11 by the rollers 42 and the reaction to this force is taken by the washers 41 and the camming surfaces 44 on the pressure plate 17. The pressure plate 17 will therefore be urged with increasing force toward engagement with the clutch disc 14 which is therefore clamped more tightly between the pressure plate 17 and the flywheel 10. It is very important to notice that the centrifugal result is, in effect, accomplished by a wheel and axle action and that the rollers 42 and the washers 41 roll freely on their respective, associated cam surfaces. The friction developed thereby is therefore minimized, as is the force required to disengage the clutch at any time.

Referring now to the embodiment of the present invention illustrated in Figures 6 through 8 there is illustrated in Figure 7 a flywheel 10, a clutch disc 14 and a pressure plate 17'. As described before, a plurality of helical springs 18 are provided which bias the pressure plate 17' toward the position in which it clampingly engages the clutch disc 14 to the flywheel 10, the reaction of the helical springs being taken by a cover 11. As previously described, the cover 11 is provided with a plurality of circumferentially spaced camming surfaces 45 thereon.

The centrifugally responsive weight means are indicated in general by the numeral 50 and comprise a plurality of circumferentially spaced, generally U-shaped holders 51 each of which is provided with a tapered tab 52 which is loosely received in an associated opening 53 in the pressure plate 17'. The holders 51 have a back portion 54 terminating in a knife edge 55 disposed in engagement with the face of the pressure plate 17', as best illustrated in Figure 8. The holders 51 additionally are provided with a pair of spaced legs 56, each of which has formed therein a slot which comprises a generally straight horizontal portion 57, a generally straight radial portion 58 and a third portion 59. Operating within each of these slots is a trunnion 61 of annular exterior configuration projecting latterly outwardly of a centrifugal roller 62, also annular in configuration.

When the engine of the vehicle in which the device of the present invention just described is stopped, the centrifugally responsive weight means 50 will be rotated slightly from the position illustrated in Figure 7, the tab 52 however being sufficiently long to remain within opening 53 and hold the weight means 50 in the pressure plate 17'. The roller 62 would be moved along the surface 57 but would maintain engagement with the inner surface of the associated camming surface 45. When the vehicle is started, the weight means 50 will assume approximately the position illustrated in Figure 7 due to the centrifugal force generated by rotation of the clutch, the holders 51 pivoting about its knife edge contact 55 with the pressure plate 17'. At high speed, and therefore high centrifugal forces, holders 51 will tend to pivot further outwardly along this knife edge contact and the roller 62 will be urged radially outwardly, the trunnions 61 tending to roll upwardly along the surfaces 58. It is important to notice that as this action occurs, the trunnions 61 are engaged in a line contact with the substantially vertical slot portions 58 so that friction between these members is at an absolute minimum. As the roller 62 is forced outwardly by centrifugal force, the horizontal component of such force will react against the associated camming surface 45 and the reaction to this force will be transmitted through the holders 51 to the pressure plate 17', tending to hold the clutch disc 14 in tight engagement with the pressure plate 10. It should be noted that even under high rotative conditions, if it is desired to release the clutch, the trunnions 61 will roll readily along the slot portions 58 to permit this releasing action of the clutch with a minimum of effort on the part of the vehicle operator.

In both embodiments of the present invention means have been disclosed which are very inexpensive to produce, but which operate with an absolute minimum of friction, the clutch being releasable by the vehicle operator at will without his having to overcome undue frictional forces.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

I claim:

1. In a semi-centrifugal clutch, a pressure plate, a cover, cam means on said cover, a plurality of centrifugally responsive means adapted to effect relative motion between said pressure plate and cover, a plurality of pairs of circumferentially spaced projections on said pressure plate respectively receiving said centrifugally responsive means respectively between each pair of projections, cam means formed on each of said projections adjacent the connection thereof with said pressure plate; said centrifugally responsive means comprising annular roller means adapted to engage said cover cam means, annular guide means at opposite sides of said roller means adapted to engage said cam means on said projections, and an axle member disposed between said projections rigidly connected to certain of said annular means and rotatably mounting other of said annular means.

2. The device defined in claim 1 in which said axle member is rigidly connected to said annular guide means and in which said annular roller means are provided with central opening defining means directly and rotatably mounted upon said axle member.

References Cited in the file of this patent

UNITED STATES PATENTS

| 834,499 | Sturtevant | Oct. 30, 1906 |
| 2,107,739 | Nutt et al. | Feb. 8, 1938 |
| 2,196,475 | Reed | Apr. 9, 1940 |

FOREIGN PATENTS

| 1,016,348 | France | Aug. 27, 1952 |